United States Patent
Huang et al.

(10) Patent No.: US 10,784,790 B1
(45) Date of Patent: Sep. 22, 2020

(54) RESONANT CONVERSION APPARATUS WITH EXTENDED HOLD-UP TIME AND METHOD OF OPERATING THE SAME

(71) Applicant: DELTA ELECTRONICS, INC., Taoyuan (TW)

(72) Inventors: Chia-Hsiong Huang, Taoyuan (TW); Yi-Hsun Chiu, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 16/502,605

(22) Filed: Jul. 3, 2019

(30) Foreign Application Priority Data

Mar. 4, 2019 (CN) .......................... 2019 1 0159169

(51) Int. Cl.
*H02M 3/335* (2006.01)
*H02M 1/08* (2006.01)

(52) U.S. Cl.
CPC ......... *H02M 3/33576* (2013.01); *H02M 1/08* (2013.01)

(58) Field of Classification Search
CPC ......... H02M 3/33507; H02M 3/33523; H02M 3/33569; H02M 3/33576; H02M 3/33592; H02M 1/08; H02M 1/32; H02M 2001/0032; H02M 2007/4815; Y02B 70/1433; Y02B 70/1441; Y02B 70/1475
USPC .................. 363/15–20, 21.02–21.06, 24, 25; 323/237
See application file for complete search history.

(56) References Cited

U.S. PATENT DOCUMENTS

| | | | |
|---|---|---|---|
| 7,660,133 B1* | 2/2010 | Hwang | H02M 3/33592 363/16 |
| 9,143,040 B2 | 9/2015 | Lee | |
| 9,887,633 B2* | 2/2018 | Choi | H02M 3/33569 |
| 2004/0052100 A1* | 3/2004 | Huang | H02M 1/38 363/125 |
| 2009/0016083 A1* | 1/2009 | Soldano | H02M 3/33592 363/20 |
| 2009/0251925 A1* | 10/2009 | Usui | H02M 3/33561 363/16 |
| 2010/0182803 A1* | 7/2010 | Nan | H02M 3/33592 363/21.02 |
| 2013/0194831 A1* | 8/2013 | Hu | H02M 3/33507 363/21.01 |
| 2016/0294299 A1 | 10/2016 | Fan et al. | |

FOREIGN PATENT DOCUMENTS

CN 104333240 A 2/2015

OTHER PUBLICATIONS

Office Action which corresponds to Taiwanese Application No. 108106980; dated Aug. 14, 2019.

* cited by examiner

*Primary Examiner* — Yemane Mehari
(74) *Attorney, Agent, or Firm* — Muncy, Geissler, Olds & Lowe, P.C.

(57) ABSTRACT

A resonant conversion apparatus with extended hold-up time includes a resonant conversion unit, a time-extended unit, and a control unit. The resonant conversion unit includes a primary side, a transformer unit, and a secondary side. The time-extended unit includes a coil and a bridge arm assembly. When a switching frequency of the primary side is less than a critical frequency, the control unit controls the bridge arm assembly being switched on or switched off so that an output voltage of the resonant conversion apparatus is higher than a predetermined voltage within a hold-up time.

16 Claims, 7 Drawing Sheets

RESONANT CONVERSION APPARATUS WITH EXTENDED HOLD-UP TIME AND METHOD OF OPERATING THE SAME

BACKGROUND

Technical Field

The present disclosure relates to a resonant conversion apparatus with extended hold-up time, and more particularly to a resonant conversion apparatus that its output voltage is higher than a predetermined voltage within a hold-up time.

Description of Related Art

The statements in this section merely provide background information related to the present disclosure and do not necessarily constitute prior art.

In recent years, electronic products have become more and more demanding on the quality of power supplies. Especially in precision electronic products, irreversible damage may occur when the input voltage is unstable. Therefore, the requirements of power converters for supplying power are gradually increasing with the popularity of electronic products and their emphasis on power quality. Once the input voltage is insufficient during the power supply of the power converter to the electronic product, it needs to be able to maintain the power converter continuously output power for a period of time. Accordingly, the electronic products coupled at the back end have sufficient time to react and complete storage or backup of the data before the power is cut off. On the contrary, if the power converter cannot provide a stable output voltage for a period of time after the input voltage is insufficient, it may easily cause the back-end electronic product to have insufficient time to react, thereby causing loss of data of the electronic product or damage of the electronic product.

In particular, when the input voltage of the power converter is insufficient, the capacity of a bulk capacitor of the power converter would affect the length of the hold-up time of the power converter. In order to effectively extend the time of providing the rated output voltage by the power converter after the input voltage is insufficient, the most direct method is to increase the capacity of the output capacitor. The output capacitor with larger capacity can provide a longer discharging time so as to extend the time of providing the rated output voltage once the input voltage is insufficient. However, since the increased capacity of the capacitor causes the increased volume of the capacitor, the method of increasing the capacity of the output capacitor to provide a longer discharging time causes the size of the power converter to increase, and therefore it is difficult to miniaturize the power converter.

SUMMARY

In order to solve the above-mentioned problems, a resonant conversion apparatus with extended hold-up time is provided. The resonant conversion apparatus includes a resonant conversion unit, a time-extended unit, and a control unit. The resonant conversion unit includes a primary side, a secondary side, and a transformer unit. The primary side receives an input voltage. The secondary side outputs an output voltage. The transformer unit is coupled to the primary side and the secondary side. The time-extended unit includes a coil and a bridge arm assembly. The coil is coupled to the transformer unit. The bridge arm assembly is coupled to the coil and the secondary side. The control unit controls the resonant conversion unit to convert the input voltage into the output voltage. When a switching frequency of the primary side is less than a critical frequency, the control unit controls the bridge arm assembly being switched on or switched off so that the output voltage is higher than a predetermined voltage within a hold-up time.

In order to solve the above-mentioned problems, a method of operating a resonant conversion apparatus with extended hold-up time is provided. The method includes the steps of: (a) providing a resonant conversion unit to convert an input voltage into an output voltage, (b) providing a time-extended unit, when a switching frequency of the resonant conversion unit is greater than or equal to a critical frequency, the time-extended unit does not work, (c) providing a control unit to control the resonant conversion unit and the time-extended unit, and (d) controlling, by the control unit, the time-extended unit being switched on or switched off so that the output voltage is higher than a predetermined voltage within a hold-up time when a switching frequency of the resonant conversion unit is less than the critical frequency.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
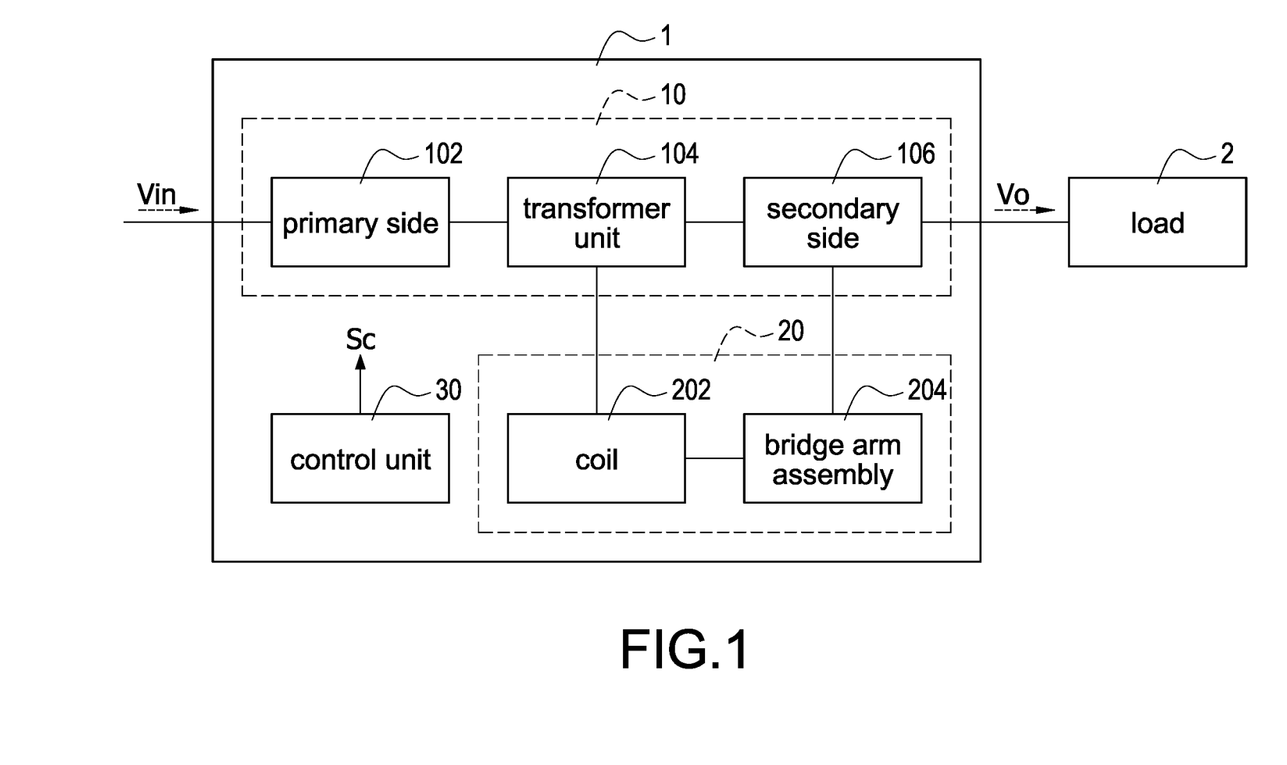
FIG. 1 is a block diagram of a resonant conversion apparatus with extended hold-up time according to the present disclosure.

Please refer to FIG. 1, which is a block diagram of a resonant conversion apparatus with extended hold-up time according to the present disclosure. The resonant conversion apparatus 1 receives an input voltage Vin and converts the input voltage Vin into an output voltage Vo for supplying power to a load 2. The resonant conversion apparatus 1 includes a resonant conversion unit 10, a time-extended unit 20, and a control unit 30. The time-extended unit 20 is coupled to the resonant conversion unit 10, and the control unit 30 is coupled to the resonant conversion unit 10 and the time-extended unit 20. The resonant conversion unit 10 includes a primary side 102, a transformer unit 104, and a secondary side 106. The primary side 102 receives the input voltage Vin. The transformer unit 104 is coupled to the primary side 102 and the secondary side 106. The secondary side 106 provides the output voltage Vo. The time-extended unit 20 includes a coil 202 and a bridge arm assembly 204. The coil 202 is coupled to the transformer unit 104, and the bridge arm assembly 204 is coupled to the coil 202 and the secondary side 106. The control unit 30 provides a control signal Sc to control the primary side 102, the secondary side 106, and the bridge arm assembly 204 to maintain the operation of the resonant conversion apparatus 1.

When the input voltage Vin is normal, the control unit 30 outputs the control signal Sc to control the primary side 102 and the secondary side 106 so that the resonant conversion unit 10 converts the input voltage Vin into the output voltage Vo. At this condition, the control unit 30 does not output the control signal Sc to control the bridge arm assembly 204, and therefore the time-extended unit 20 does not work. If the input voltage Vin is insufficient, the control unit 30 further outputs the control signal Sc to control the bridge arm assembly 204 so that the energy stored in the primary side 102 is converted to the output voltage Vo, thereby temporarily maintaining the output voltage Vo to be higher than a predetermined output voltage (hereinafter referred to as a "predetermined voltage").

In one embodiment of the present disclosure, the "insufficient input voltage Vin" represents that the input voltage Vin is gradually decreased to zero. Specifically, a front-stage device, such as but not limited to a power factor corrector (PFC) is usually coupled to a front end of the resonant conversion apparatus 1. When an input power source is failed or the front-stage device itself is disabled due to an abnormality, an output voltage of the front-stage device would be temporarily maintained above a certain voltage level due to the energy stored in the output capacitor. Until the energy is gradually consumed, the output voltage (i.e., the input voltage Vin of the resonant conversion apparatus 1) of the front-stage device is gradually reduced to zero.

The main purpose of the present disclosure is that if the input voltage Vin is insufficient, the control unit 30 can control the bridge arm assembly 204 being switched on or switched off so that the coil 202 is shorted or coupled to the secondary side 106 to transmit the energy stored in the primary side 102 to the secondary side 106 through the transformer unit 104 or the time-extended unit 20. Therefore, the output voltage Vo of the resonant conversion apparatus 1 can be maintained above the predetermined voltage within the hold-up time even if the input voltage Vin is insufficient. For example, the output voltage Vo of the resonant conversion apparatus 1 without the time-extended unit 20 could be maintained above the predetermined voltage only about, for example but not limited to 10 milliseconds, however, the output voltage Vo of the resonant conversion apparatus 1 with the time-extended unit 20 could be maintained above the predetermined voltage more than, for example but not limited to 20 milliseconds. In other words, the hold-up time of the latter is two times as large as that of the former. Accordingly, in comparison with the resonant conversion apparatus 1 without the time-extended unit 20, the resonant conversion apparatus 1 of the present disclosure can achieve the effect of extending the hold-up time without increasing the storage capacity of the secondary side 106.

Figure 2A:
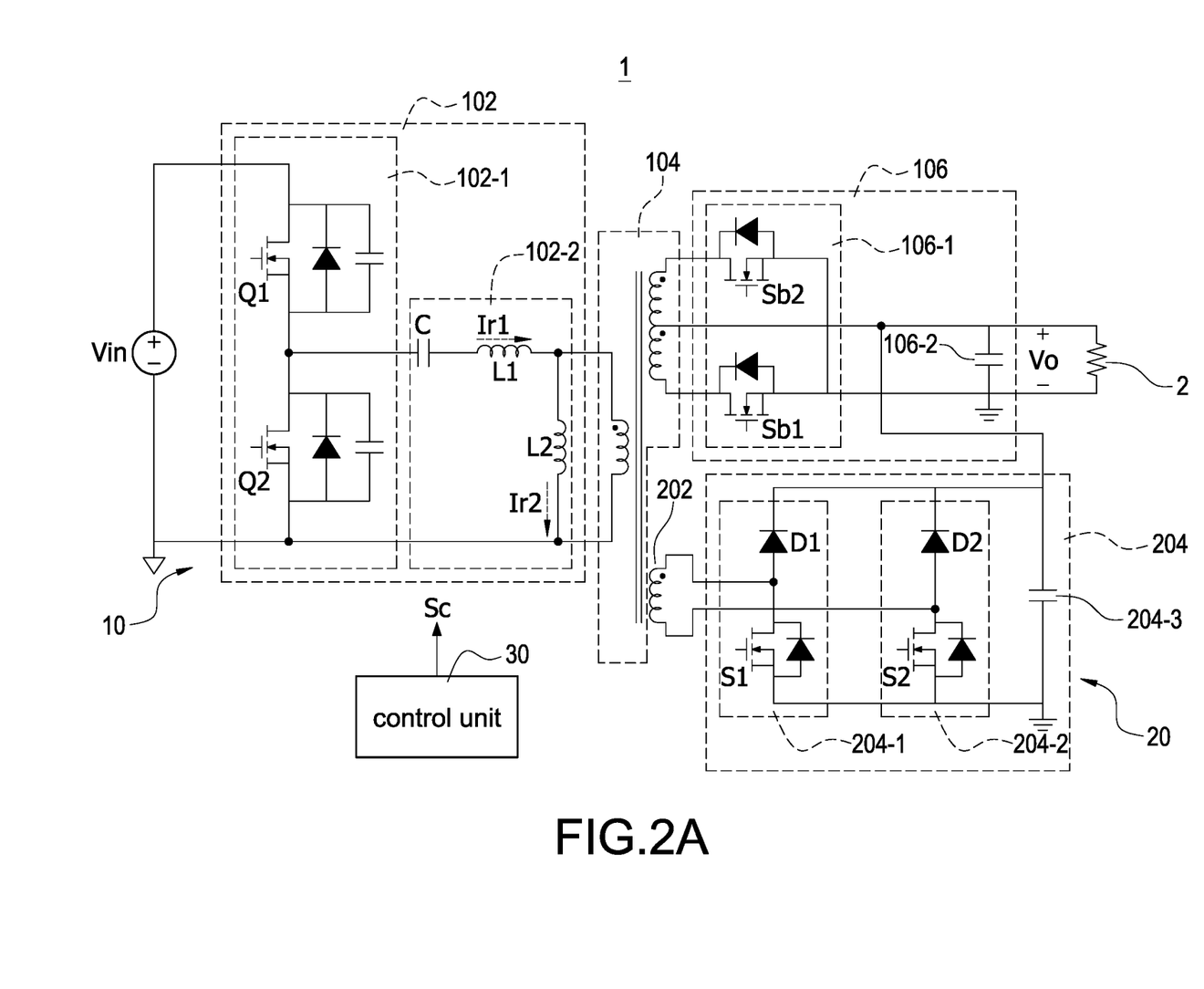
FIG. 2A is a block circuit diagram of the resonant conversion apparatus with extended hold-up time according to a first embodiment of the present disclosure.

Please refer to FIG. 2A, which is a block circuit diagram of the resonant conversion apparatus with extended hold-up time according to a first embodiment of the present disclosure, and also refer to FIG. 1. The primary side 102 has a switching unit 102-1 and a resonant unit 102-2. The switching unit 102-1 receives the input voltage Vin, and the resonant unit 102-2 is coupled to the switching unit 102-1 and a primary side of the transformer unit 104. The secondary side 106 has a rectifying unit 106-1 and an output capacitor 106-2. The rectifying unit 106-1 is coupled to a secondary side of the transformer unit 104. The output capacitor 106-2 is coupled to the rectifying unit 106-1 and the bridge arm assembly 204 for stabilizing a voltage value of the output voltage Vo. The bridge arm assembly 204 has a first bridge arm 204-1, a second bridge arm 204-2, and an energy-storing capacitor 204-3 coupled in parallel to each other. The first bridge arm 204-1 has a first diode D1 and a first switch S1 connected in series to the first diode D1. The second bridge arm 204-2 has a second diode D2 and a second switch S2 connected in series to the second diode D2. The coil 202 has a first end and a second end. The first end is coupled between an anode of the first diode D1 and the first switch S1, and the second end is coupled between an anode of the second diode D2 and the second switch S2. A cathode of the first diode D1, a cathode of the second diode D2, and one end of the energy-storing capacitor 204-3 are coupled to the output capacitor 106-2.

A switching frequency of the switching unit 102-1 and the rectifying unit 106-1 may be determined by the control unit 30 according to a status of an input end or an output end of the resonant conversion apparatus 1. Specifically, when the switching frequency of the control signal Sc, which is transmitted from the control unit 30 to the switching unit 102-1, is greater than or equal to a critical frequency, it represents that the input voltage Vin of the resonant conversion apparatus 1 is normal. In particular, the critical frequency is set by a circuit designer according to the practice. At this condition, the control unit 30 controls switching of the switching unit 102-1 to provide the energy stored in the resonant unit 102-2 from the input voltage Vin. The energy stored in the resonant unit 102-2 is converted and transmitted to the secondary side 106 through the transformer unit 104, and therefore the output voltage Vo is produced by the rectifying unit 106-1 for rectifying and the output capacitor 106-2 for stabilizing. At this condition, the control unit 30 does not output the control signal Sc to control the first switch S1 and the second switch S2 of the bridge arm assembly 204, and therefore the first switch S1 and the second switch S2 are not switched on. Since the first switch S1 and the second switch S2 are switched off, an energy-storing path fails to be formed so that the time-extended unit 20 does not work.

When the switching frequency of the control signal Sc (i.e., the switching frequency of the switching unit 102-1) is less than the critical frequency, it represents that the input voltage Vin is insufficient. In other words, the lower the input voltage Vin, the lower the switching frequency. When the switching frequency of the switching unit 102-1 is less than the critical frequency, it represents that the input voltage Vin is lower than the acceptable range of the control unit 30. At this condition, in order to maintain the output voltage Vo being greater than the predetermined voltage within the hold-up time, the control unit 30 controls the first switch S1 and the second switch S2 of the bridge arm assembly 204 being switched on or switched off. When the first switch S1 and the second switch S2 of the bridge arm assembly 204 are switched on by the control unit 30, the coil 202 is shorted so that the resonant unit 102-2 starts to store energy. At this condition, the voltage of the output voltage Vo of the resonant conversion apparatus 1 is stably outputted by only the energy stored in the output capacitor 106-2. When the first switch S1 and the second switch S2 of the bridge arm assembly 204 are switched off by the control unit 30, the energy stored in the resonant unit 102-2 is provided to the output capacitor 106-2 of the secondary side 106 through the coil 202 and the bridge arm assembly 204 so that the output capacitor 106-2 can continuously provide the output voltage Vo which is higher than the predetermined voltage.

Specifically, the frequency determination in the present disclosure is implemented according to the control signal Sc outputted from the control unit 30. In other words, the control signal Sc of controlling the switching unit 102-1 is provided from the control unit 30, and the control unit 30 realizes the switching frequency when outputting the control signal Sc. Therefore, it is quick and accurate to realize that the input voltage Vin is insufficient. Moreover, when the loading of the resonant conversion apparatus 1 is changed to a heavy load, it may cause the switching frequency of the switching unit 102-1 to be less than the critical frequency. Hence, in order to increase the accuracy of identifying whether the input voltage Vin is really insufficient, in one embodiment of the present disclosure, other determination conditions may be used. For example but not limited to an AC_OK signal (i.e., input confirmation signal) is provided when a front-stage device, such as a power factor corrector (PFC) coupled to a front end of the resonant conversion apparatus 1 is normal. That is, when the control unit 30 consciously switches the frequency to be less than the critical frequency, and the control unit 30 does not receive the AC_OK signal provided from the front-stage device, the control unit 30 can accurately determine that the input voltage Vin is insufficient, thereby reducing the occurrence of malfunctions.

Moreover, when the switching frequency of the switching unit 102-1 of the primary side 102 is greater than or equal to the critical frequency, the control unit 30 controls or adjusts the switching frequency of the switching unit 102-1 according to the voltage of the output voltage Vo. When the switching frequency of the switching unit 102-1 is less than the critical frequency, such as but not limited to 40 kHz and the AC_OK signal provided from the front-stage device is not received, it represents that the input voltage Vin is insufficient. At this condition, the control unit 30 forcibly increase the switching frequency of the switching unit 102-1 to the resonant frequency, such as but not limited to 50 kHz. After the switching frequency is increased to the resonant frequency, the control unit 30 controls the switching frequency and the duty cycle to be fixed, that is, the switching frequency is fixed at the resonant frequency. When the switching frequency of the switching unit 102-1 is adjusted (increased) to the resonant frequency, the resonant current of the resonant unit 102-2 would be reduced so as to reduce the power consumption of the resonant conversion apparatus 1 due to stably maintaining the output voltage Vo. When the switching frequency of the switching unit 102-1 of the primary side 102 is less than the critical frequency, the control unit 30 controls the bridge arm assembly 204 starting to switch, and the switching frequency of the bridge arm assembly 204 is adjusted to the resonant frequency. Afterward, the control unit 30 adjusts the duty cycle of the bridge arm assembly 204 according to the voltage of the output voltage Vo. In particular, the adjustment of the duty cycle is related to the energy stored in the resonant unit 102-2. If the input voltage Vin is higher, the smaller duty cycle could is adjusted to meet the required energy for the load, and vice versa. When the duty cycle of the first switch S1 and the second switch S2 of the bridge arm assembly 204 is larger, the energy acquired by the secondary side 106 is greater so that the hold-up time can be longer, for example but not limited to from two times to 2.5 times.

Figure 2B:
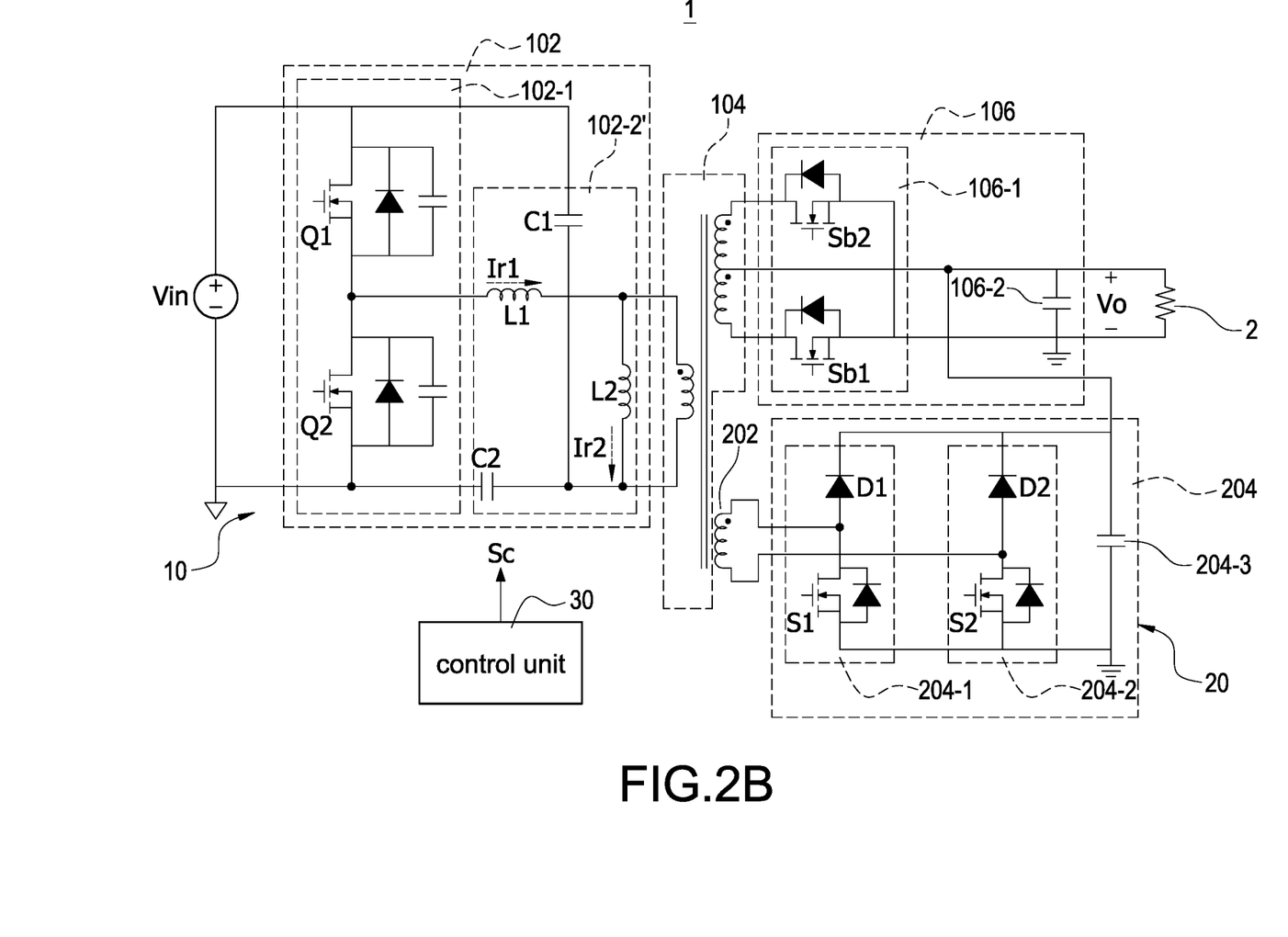
FIG. 2B is a block circuit diagram of the resonant conversion apparatus with extended hold-up time according to a second embodiment of the present disclosure.

Please refer to FIG. 2B, which is a block circuit diagram of the resonant conversion apparatus with extended hold-up time according to a second embodiment of the present disclosure, and also refer to FIG. 2A. The major difference between the resonant conversion apparatus 1 shown in FIG. 2B and that shown in FIG. 2A is that a resonant unit 102-2' of the former is a dual-capacitor resonant unit and the resonant unit 102-2 of the latter is a single-capacitor resonant unit. In other words, the single-capacitor resonant unit 102-2 shown in FIG. 2A has only a resonant capacitor C coupled to an upper switch Q1 and a lower switch Q2 of the switching unit 102-1, and a first resonant inductor L1; the dual-capacitor resonant unit 102-2' shown in FIG. 2B has two series-connected resonant capacitors C1, C2 coupled to the upper switch Q1 and the lower switch Q2 of the switching unit 102-1, and a second resonant inductor L2. In comparison with the single resonant capacitor C, two resonant capacitors C1, C2 are used to reduce voltage stresses across the two resonant capacitors C1, C2 so that the selection of the resonant capacitor is more flexible, i.e., the resonant capacitor can be selected for reduction of the specification. Regardless of the resonant conversion apparatuses shown in FIG. 2B and FIG. 2A, the control manners of the time extension are identical.

In one embodiment of the present disclosure, the switching unit 102-1 may be a half-bridge switching unit (shown in FIG. 2A and FIG. 2B), or a full-bridge switching unit (not shown). For the full-bridge switching unit, two in-parallel bridge arms are provided, and the circuit structure or control manner is known to those skilled in the art. Moreover, in one embodiment of the present disclosure, the diode connected in parallel to the switch element (such as the upper switch Q1, the lower switch Q2, the first rectifying switch Sb1, the second rectifying switch Sb2, the first switch S1, and the second switch S2) may be a junction diode inside the switch element or a physical diode externally connected to the switch element.

Figure 3A:
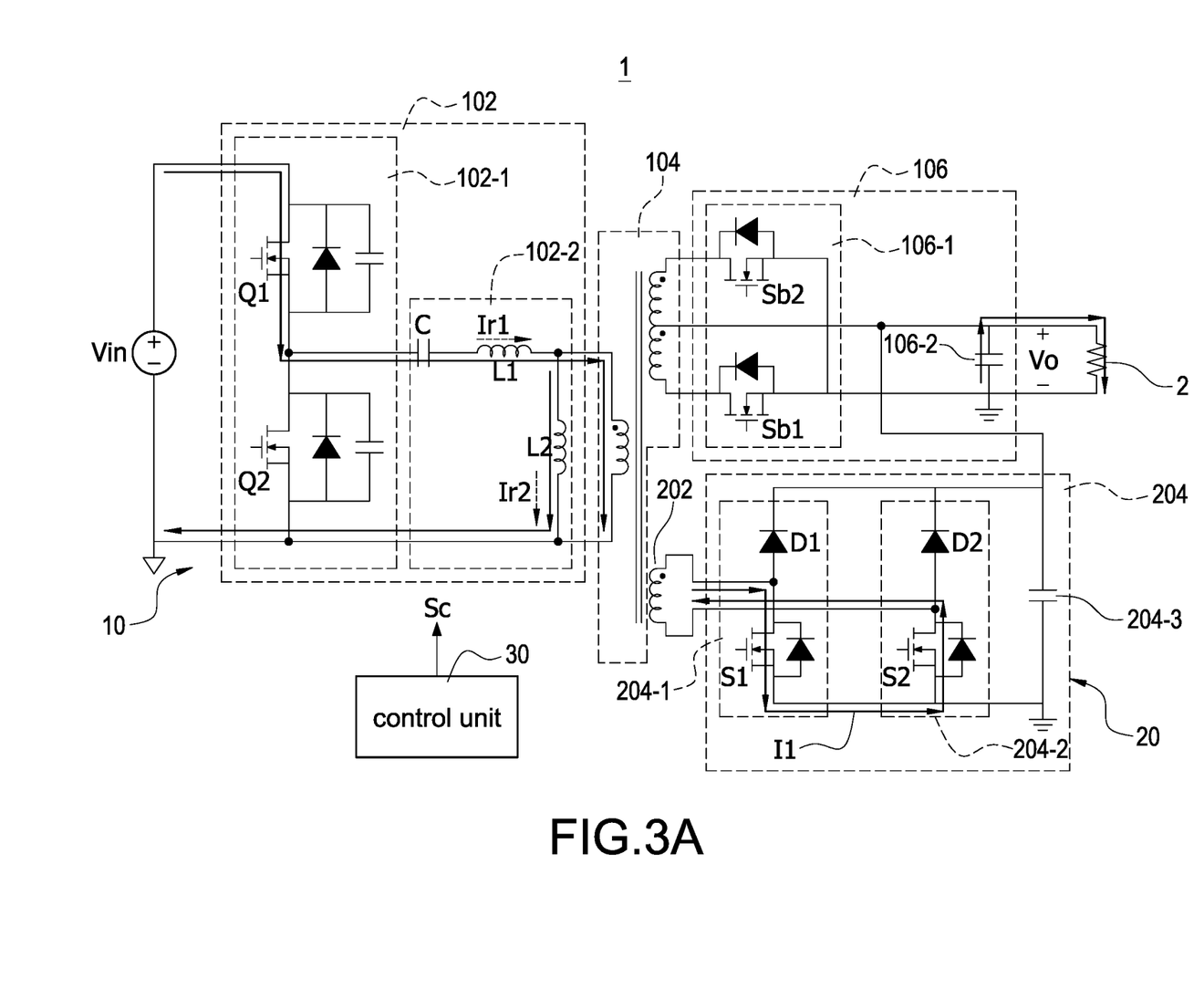
FIG. 3A shows a first current loop in FIG. 2A when a switching frequency of the resonant conversion apparatus is less than a critical frequency.

Please refer to FIG. 3A, which shows a first current loop in FIG. 2A when the switching frequency of the resonant conversion apparatus is less than the critical frequency, and also refer to FIG. 2A. When the switching frequency of the switching unit 102-1 of the primary side 102 is less than the critical frequency, the control unit 30 outputs the control signal Sc to control the first switch S1 and the second switch S2 of the bridge arm assembly 204 being switched on or switched off. When upper switch Q1 of the switching unit 102-1 is switched on and the switching frequency is less than the critical frequency, the control unit 30 controls the first switch S1 and the second switch S2 being switched on and a path between the rectifying unit 106-1 and the output capacitor 106-2 is not conductive. At this condition, a current loop is formed among the input voltage Vin of the primary side 102, the upper switch Q1 of the switching unit 102-1, and the resonant unit 102-2. Since the first switch S1 and the second switch S2 are switched on, the coil 202 is shorted. Therefore, a first current loop I1 is formed among the coil 202 (flowing out of a dotted end thereof) of the time-extended unit 20, the first switch S1, and the second switch S2 so that the resonant capacitor C and the first resonant inductor L1 of the resonant unit 102-2 start to store energy. Moreover, since the rectifying unit 106-1 of the secondary side 106 is not conductive, the energy stored in the output capacitor 106-2 is consumed to supply power to the load 2.

Figure 3B:
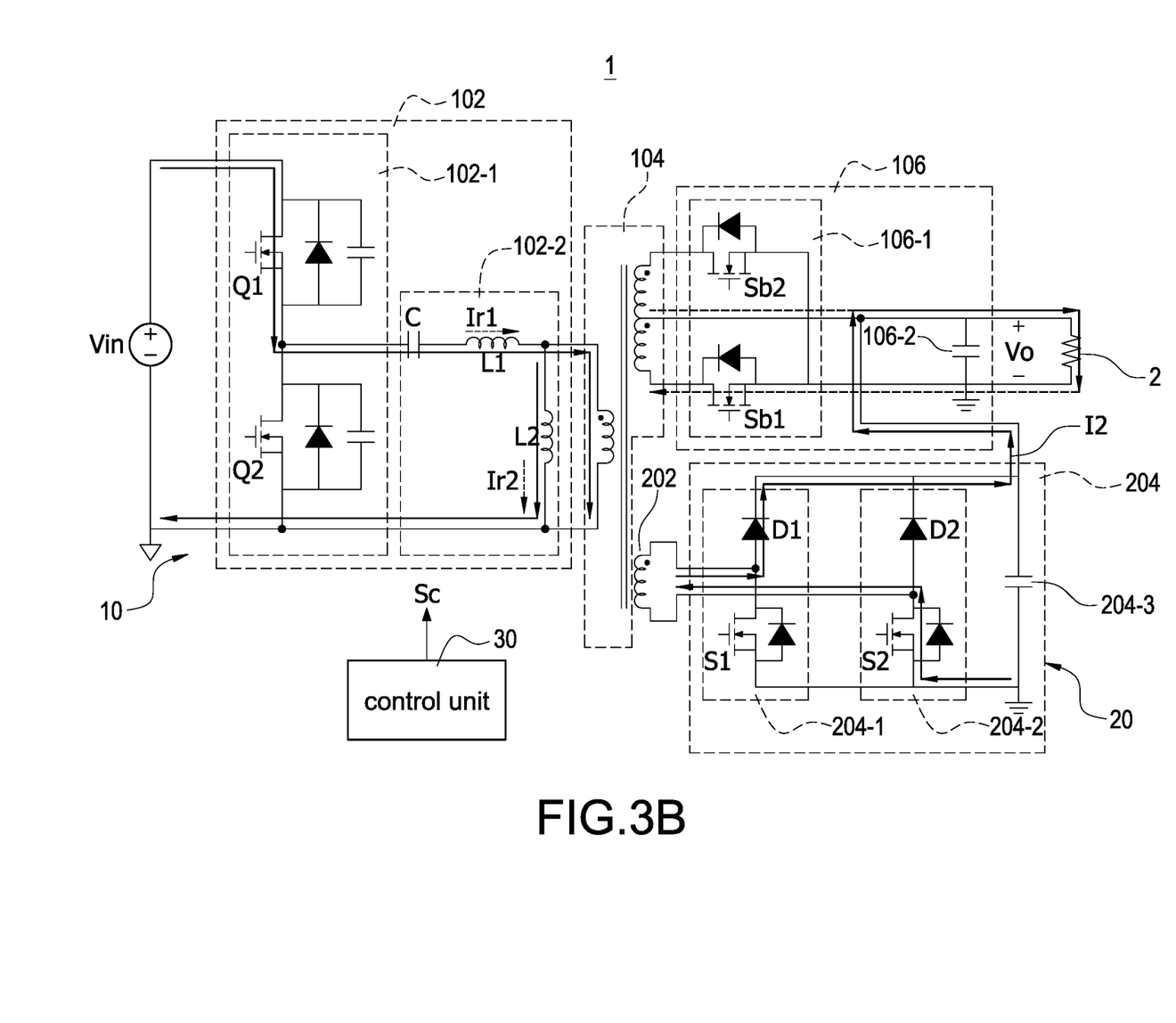
FIG. 3B shows a second current loop in FIG. 2A when the switching frequency of the resonant conversion apparatus is less than the critical frequency.

Please refer to FIG. 3B, which shows a second current loop in FIG. 2A when the switching frequency of the resonant conversion apparatus is less than the critical frequency, and also refer to FIG. 2A. When the upper switch Q1 of the switching unit 102-1 is switched on and the switching frequency is less than the critical frequency, the control unit 30 controls the first switch S1 and the second switch S2 being switched off. At this condition, a second current loop 12 is formed among the coil 202 (flowing out of the dotted end thereof) of the time-extended unit 20, the first diode D1, the energy-storing capacitor 204-3, the output capacitor 106-2, and the second switch S2 (flowing through the junction diode thereof) so that the energy stored in the resonant unit 102-2 is coupled to the coil 202 to release the energy to the energy-storing capacitor 204-3 and the output capacitor 106-2. If the energy stored in the output capacitor 106-2 is insufficient, the energy stored in the energy-storing capacitor 204-3 could be provided to the output capacitor 106-2 so that the output capacitor 106-2 can continuously and stably provide the output voltage Vo. Furthermore, when the switching frequency is less than the critical frequency, and the first switch S1 and the second switch S2 are switched off, a part of energy stored in the resonant unit 102-2 could be transmitted through the secondary side 106. When the first rectifying switch Sb1 is switched off, the current flows through a junction diode of the first rectifying switch Sb1; when the first rectifying switch Sb1 is switched on, the current flows through the first rectifying switch Sb1. Although switched-on and switched-off states of the first rectifying switch Sb1 are controlled by the control unit 30, the first rectifying switch Sb1 is preferably switched on for better efficiency.

In one embodiment of the present disclosure, FIG. 3A and FIG. 3B show current paths when the upper switch Q1 of the switching unit 102-1 is switched on. When the lower switch Q2 of the switching unit 102-1 is switched on, another current loop is formed among the input voltage Vin of the primary side 102, the lower switch Q2 of the switching unit 102-1, and the resonant unit 102-2. At this condition, the current loop of the secondary side 106 and the time-extended unit 20 is identical as shown in FIG. 3A and FIG. 3B, but the current path of the primary side 102 is opposite as shown in FIG. 3A and FIG. 3B. When the first switch S1 and the second switch S2 are switched off, a part of energy provided to the resonant unit 102-2 from the secondary side 106 is transmitted through a current path having the second rectifying switch Sb2.

Specifically, when the first switch S1 and the second switch S2 are switched off, a current flowing through a junction diode of the second switch S2 to form a second current loop 12 so that the current can flow through the second current loop 12 once the first switch S1 and the second switch S2 are switched off, thereby avoiding waste of the available energy. In addition, the energy-storing capacitor 204-3 can store energy to supply the output capacitor 106-2 having insufficient energy once the first switch S1 and the second switch S2 are switched off. Therefore, in addition to stabilizing the voltage value of the output voltage Vo, it is also to effectively stabilize the ripple of the output voltage Vo when the input voltage Vin is insufficient. Further, the excess current does not surge to the output capacitor 106-2 to avoid producing a current spike at the moment of switching off the first switch S1 and the second switch S2.

Figure 4:
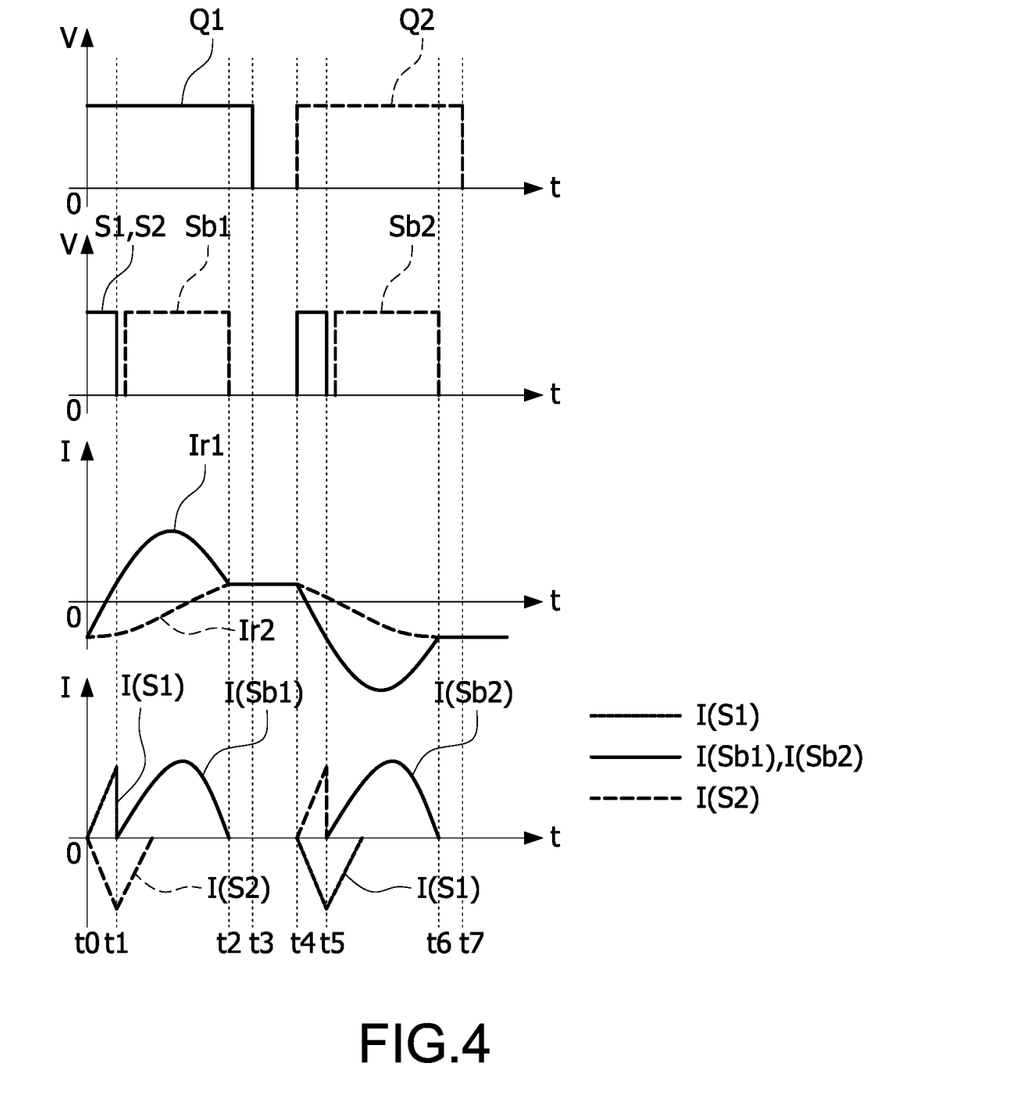
FIG. 4 shows schematic voltage and current waveforms of the resonant conversion apparatus when the switching frequency thereof is less than the critical frequency.

Please refer to FIG. 4, which shows schematic voltage and current waveforms of the resonant conversion apparatus when the switching frequency thereof is less than the critical frequency, and also refer to FIG. 1 to FIG. 3B. When the switching frequency is less than the critical frequency, the upper switch Q1 of the primary side 102 is switched on during time t0 and time t3. During time t0 and time t1, a path between the rectifying unit 106-1 and the output capacitor 106-2 is not conductive. Also, the coil 202 is shorted when the first switch S1 and the second switch S2 are switched on (i.e., the first current loop I1). At this condition, the resonant capacitor C and the first resonant inductor L1 of the resonant unit 102-2 store energy so that a first resonant current Ir1 starts increasing. During time t1 and time t2, the first switch S1 and the second switch S2 are switched off. At this condition, the first resonant inductor L1 is gradually converted from an energy-storing state to an energy-releasing state, and therefore the first resonant current Ir1 is gradually converted from increased to reduced, and the energy is transmitted through the junction diode of the second switch S2 (i.e., the second current loop 12). When the first rectifying switch Sb1 is switched on, the path between the rectifying unit 106-1 and the output capacitor 106-2 is conductive so that the current flowing the first rectifying switch Sb1 charges the output capacitor 106-2. During time t2 and time t3, the path between the rectifying unit 106-1 and the output capacitor 106-2 is not conductive, and the first switch S1 and the second switch S2 are switched off. At this condition, no energy is transmitted form the primary side 102 to the secondary side 106 and the time-extended unit 20, and therefore a current path is formed by the primary side 102 itself.

When the switching frequency is less than the critical frequency, the lower switch Q2 of the primary side 102 is switched on during time t4 and time t7. Also, during time t4 and time t7, the first resonant current Ir1 and the second resonant current Ir2 are opposite to those during time t0 and time t3. The current, which originally flows through the first rectifying switch Sb1 when the upper switch Q1 is switched on, is changed to flow through the second rectifying switch Sb2. Moreover, the current flowing through the first switch S1 and the current flowing through the second switch S2 are opposite to those during time t0 and time t3.

Figure 5:
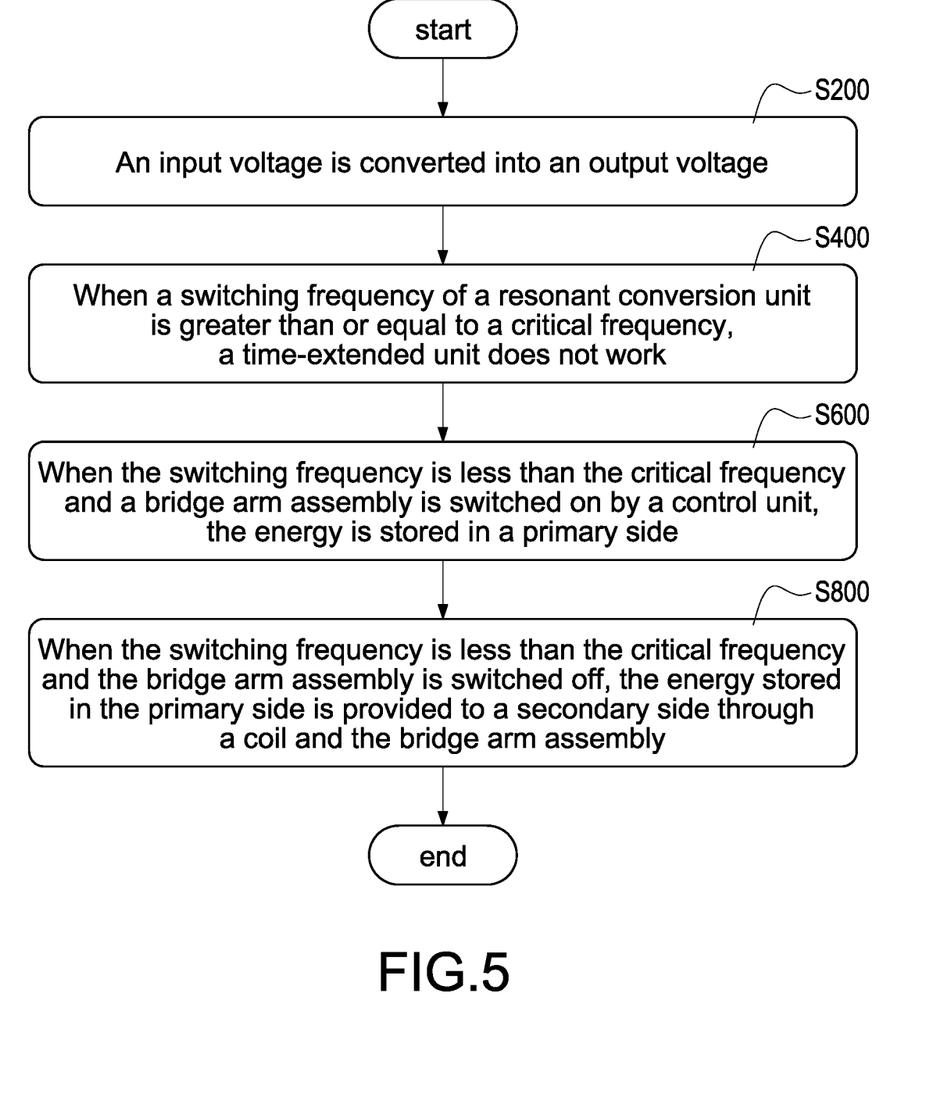
FIG. 5 is a flowchart of a method of operating the resonant conversion apparatus according to the present disclosure.

Please refer to FIG. 5, which is a flowchart of a method of operating the resonant conversion apparatus according to the present disclosure, and also refer to FIG. 1 to FIG. 4. The resonant conversion apparatus 1 receives an input voltage Vin and converts the input voltage Vin into an output voltage Vo for supplying power to a load 2. The resonant conversion apparatus 1 includes a resonant conversion unit 10, a time-extended unit 20, and a control unit 30. The time-extended unit 20 is coupled to the resonant conversion unit 10, and the control unit 30 is coupled to the resonant conversion unit 10 and the time-extended unit 20. The method includes the following steps. First, the input voltage Vin is converted into the output voltage Vo (S200). When the input voltage Vin is normal, the control unit 30 outputs a control signal Sc to control a primary side 102 and a secondary side 106 so that the resonant conversion unit 10 converts the input voltage Vin into the output voltage Vo. Afterward, when a switching frequency of the resonant conversion unit 10 is greater than or equal to a critical frequency, the time-extended unit 20 does not work (S400). Specially, when the switching frequency of the resonant conversion unit 10 is greater than or equal to the critical frequency, it represents that the input voltage Vin is still normal. At this condition, the control unit 30 does not output the control signal Sc to control a bridge arm assembly 204, and therefore the time-extended unit 20 does not work.

When the switching frequency of the resonant conversion unit 10 is less than the critical frequency and the bridge arm assembly 204 is switched on by the control unit 30, the energy is stored in the primary side 102 (S600). When the switching frequency of the resonant conversion unit 10 is less than the critical frequency (the AC_OK signal used for determination the frequency is mentioned above and the detail is omitted here for conciseness) it represents that the input voltage Vin is insufficient. At this condition, the control signal Sc outputted from the control unit 30 switches on the switches of the bridge arm assembly 204 to make the coil 202 be shorted so that the energy is stored in the resonant unit 102-2 of the primary side 102. When the switching frequency is less than the critical frequency and the bridge arm assembly 204 is switched off, the energy stored in the primary side 102 is provided to the secondary side 106 through the coil 202 and the bridge arm assembly 204 (S800). Accordingly, the output voltage Vo of the resonant conversion apparatus 1 is higher than the predetermined voltage within the hold-up time by executing the steps (S600)-(S800).

In conclusion, the main purpose of the present disclosure is that if the input voltage Vin is insufficient, the control unit 30 can control the time-extended unit 20 to transmit the energy to the resonant conversion unit 10 by an electromagnetic coupling manner between the coil 202 and the transformer unit 104 so that the output voltage Vo of the resonant conversion apparatus 1 is higher than the predetermined voltage within the hold-up time once the input voltage Vin is insufficient.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A resonant conversion apparatus with extended hold-up time comprising:
a resonant conversion unit comprising:
a primary side receiving an input voltage,
a secondary side outputting an output voltage, and
a transformer unit coupled to the primary side and the secondary side,
a time-extended unit comprising:
a coil coupled to the transformer unit, and
a bridge arm assembly coupled to the coil and the secondary side, and
a control unit configured to control the resonant conversion unit to convert the input voltage into the output voltage,
wherein when a switching frequency of the primary side is less than a critical frequency, the control unit is configured to control the bridge arm assembly being switched on or switched off so that the output voltage outputted by the secondary side is higher than a predetermined voltage within a hold-up time after the input voltage is insufficient.

2. The resonant conversion apparatus in claim 1, wherein the primary side comprises:
a switching unit receiving the input voltage, and
a resonant unit coupled to the switching unit and the transformer unit,
wherein when the switching frequency is less than the critical frequency, the control unit is configured to control the switching unit being switched on or switched off so that energy is stored in the resonant unit, and the energy is coupled to the time-extended unit through the coil and the transformer unit so that the output voltage is maintained by the time-extended unit.

3. The resonant conversion apparatus in claim 2, wherein when the switching frequency is less than the critical frequency, the control unit is configured to control the switching frequency being gradually increased to a resonant frequency of the resonant unit; when the switching frequency is increased to the resonant frequency, the control unit is configured to control the switching frequency being fixed at the resonant frequency and control a duty cycle of the switching unit being fixed.

4. The resonant conversion apparatus in claim 2, wherein the switching unit is a half-bridge switching unit or a full-bridge switching unit.

5. The resonant conversion apparatus in claim 1, wherein when the switching frequency is less than the critical frequency and an input confirmation signal provided from a front-stage device coupled to a front end of the resonant conversion apparatus is not received by the control unit, the control unit is configured to control the bridge arm assembly being switched on or switched off.

6. The resonant conversion apparatus in claim 1, wherein the bridge arm assembly comprising:
a first bridge arm coupled to the secondary side and the first bridge arm having a first diode and a first switch connected in series to the first diode, and the coil is coupled to the first diode and the first switch, and
a second bridge arm connected in parallel to the first bridge arm and the second bridge arm having a second diode and a second switch connected in series to the second diode, and the coil is coupled to the second diode and the second switch,
wherein when the switching frequency is less than the critical frequency and the first switch and the second switch are switched on, a first current loop is formed by the coil, the first switch, and the second switch.

7. The resonant conversion apparatus in claim 6, wherein when the switching frequency is greater than or equal to the critical frequency, the first switch and the second switch are switched off so that the time-extended unit does not work.

8. The resonant conversion apparatus in claim 6, wherein the bridge arm assembly further comprises:
an energy-storing capacitor coupled in parallel to the second bridge arm,
wherein when the switching frequency is less than the critical frequency and the first switch and the second switch are switched off, a second current loop is formed by the coil, the first diode, the second switch, and the energy-storing capacitor.

9. The resonant conversion apparatus in claim 6, wherein the secondary side comprises:
a rectifying unit coupled to the transformer unit, and
an output capacitor coupled to the rectifying unit and the bridge arm assembly,
wherein when the switching frequency is less than the critical frequency and the first switch and the second switch are switched off, the output voltage is stably outputted by the output capacitor.

10. The resonant conversion apparatus in claim 9, wherein when the switching frequency is greater than or equal to the critical frequency, the energy provided from the transformer unit is rectified by the rectifying unit to the output voltage, and the output voltage is stably outputted by the output capacitor.

11. A method of operating a resonant conversion apparatus with extended hold-up time, the method comprising the steps of:
(a) providing a resonant conversion unit to convert an input voltage into an output voltage,
(b) providing a time-extended unit, when a switching frequency of the resonant conversion unit is greater than or equal to a critical frequency, the time-extended unit does not work,
(c) providing a control unit to control the resonant conversion unit and the time-extended unit, and
(d) controlling, by the control unit, the time-extended unit being switched on or switched off so that the output voltage outputted by the resonant conversion unit is higher than a predetermined voltage within a hold-up time after the input voltage is insufficient when the switching frequency of the resonant conversion unit is less than the critical frequency.

12. The method of operating the resonant conversion apparatus in claim 11, wherein the step (d) comprises the step of:
(d1) controlling, by the control unit, the switching frequency being gradually increased to a resonant frequency of the resonant conversion unit, and controlling the switching frequency being fixed at the resonant frequency and controlling a duty cycle of a switching unit of the resonant conversion unit being fixed when the switching frequency is increased to the resonant frequency.

13. The method of operating the resonant conversion apparatus in claim 11, wherein the step (d) comprises the step of:
(d2) controlling, by the control unit, the time-extended unit being switched on or switched off when the switching frequency is less than the critical frequency and an input confirmation signal provided from a front-stage device coupled to a front end of the resonant conversion apparatus is not received by the control unit.

14. The method of operating the resonant conversion apparatus in claim 11, wherein the step (d) comprises the step of:
(d3) providing a first switch, a second switch connected in parallel to the first switch, a coil coupled to the first switch and the second switch, and forming a first current loop by the coil, the first switch, and the second switch when the first switch and the second switch are switched on.

15. The method of operating the resonant conversion apparatus in claim 14, wherein the step (d3) comprises the step of:
(d4) providing an energy-storing capacitor of the time-extended unit, and forming a second current loop by the coil, a first diode which is connected in series to the first switch, the second switch, and the energy-storing capacitor when the first switch and the second switch are switched off.

16. The method of operating the resonant conversion apparatus in claim 14, wherein the step (d3) comprises the step of:
(d5) providing, by the time-extended unit, energy to the resonant conversion unit so that the output voltage is stably outputted by the resonant conversion unit when the first switch and the second switch are switched off.

* * * * *